(12) United States Patent
Dreisinger et al.

(10) Patent No.: US 7,799,295 B2
(45) Date of Patent: Sep. 21, 2010

(54) ORE LEACH METHOD WITH AQUEOUS SULFURIC ACID CONTAINING FERRIC IONS

(75) Inventors: David Dreisinger, Delta (CA); Graham Pratt, Makedonitissa (CY); Kenneth Gordon Baxter, Bullcreek (AU)

(73) Assignee: OZ Minerals Limited, Melbourne (AU)

( * ) Notice: Subject to any disclaimer, the term of this patent is extended or adjusted under 35 U.S.C. 154(b) by 711 days.

(21) Appl. No.: 10/578,533

(22) PCT Filed: Nov. 3, 2004

(86) PCT No.: PCT/AU2004/001520

§ 371 (c)(1), (2), (4) Date: Feb. 22, 2007

(87) PCT Pub. No.: WO2005/042790

PCT Pub. Date: May 12, 2005

(65) Prior Publication Data

US 2008/0050293 A1    Feb. 28, 2008

(30) Foreign Application Priority Data

Nov. 3, 2003    (AU)    ............................... 2003906041

(51) Int. Cl.
*C01G 3/00* (2006.01)

(52) U.S. Cl. .......................... 423/41; 423/141; 423/146
(58) Field of Classification Search ................... 423/41, 423/141, 146
See application file for complete search history.

(56) References Cited

U.S. PATENT DOCUMENTS

| 4,049,770 | A | * | 9/1977 | Swinkels et al. ............... 423/37 |
| 4,431,613 | A | * | 2/1984 | Verbaan ....................... 423/22 |
| 5,431,788 | A | * | 7/1995 | Jones ......................... 205/582 |
| 5,730,776 | A | * | 3/1998 | Collins et al. ................. 75/728 |
| 5,993,635 | A | | 11/1999 | Hourn et al. |
| 6,319,389 | B1 | | 11/2001 | Fountain et al. |

FOREIGN PATENT DOCUMENTS

| AU | 769984 | 2/2004 |
| GB | 2020261 | 11/1979 |
| WO | WO 00/06784 | 2/2000 |

* cited by examiner

*Primary Examiner*—Steven Bos
(74) *Attorney, Agent, or Firm*—Heslin Rothenberg Farley & Mesiti PC

(57) ABSTRACT

There is provided a method for leach extraction of copper/iron/sulphur ores and concentrates including leaching the mineral with an aqueous stream containing ferric ions and sulphuric acid in the presence of oxygen, the aqueous stream including a solution formed by reaction of basic ferric sulphate with excess suphuric acid. Integrated methods of forming and releaching basic ferric sulphate are also described.

22 Claims, 4 Drawing Sheets

ORE LEACH METHOD WITH AQUEOUS SULFURIC ACID CONTAINING FERRIC IONS

FIELD OF THE INVENTION

This invention relates to the recovery of copper by leach extraction of copper minerals. This invention in particular relates to a high temperature autoclave leaching process for sulphide-ore copper/iron concentrates for the purpose of extracting copper, and for illustrative purposes the invention is described hereinafter with reference to this application. However, it is envisaged that this invention may find application in other mineral extractions.

BACKGROUND

The atmospheric leaching of copper ores can be carried out using a variety of contactor types. Copper ores can be leached on heaps or dumps, in vats or in stirred tanks. The choice of the type of contactor will vary with the type and grade of the ore and its leach characteristics as well as local economic, environmental, topological and hydrogeological character.

The leaching of copper minerals generally proceeds by direct acid attack for simple oxides, carbonates and silicates while acid—oxidizing conditions are necessary to leach reduced copper species or copper sulphide minerals. Examples of the chemistry of leaching of different copper minerals are shown below.

Acid leaching reactions:

$CuO(s)+H_2SO_4(aq) \rightarrow CuSO_4(aq)+H_2O$ $CuCO_3(s)+H_2SO_4(aq) \rightarrow CuSO_4(aq)+H_2O+CO_2(g)$ $CuSiO_3(s)+H_2SO_4(aq) \rightarrow CuSO_4(aq)+H_2O+SiO_2(s)$ Acid—oxidizing leaching reactions using ferric sulphate as an oxidant:

$Cu_2O(s)+H_2SO_4(aq)+Fe_2(SO_4)_3(aq) \rightarrow 2CuSO_4(aq)+2FeSO_4(aq)+H_2O$ $Cu_2S(s)+2Fe_2(SO_4)_3(aq) \rightarrow 2CuSO_4(aq)+4FeSO_4(aq)+S(s)$ $CuS(s)+Fe_2(SO_4)_3(aq) \rightarrow CuSO_4(aq)+2FeSO_4(aq)+S(s)$ $Cu_5FeS_4(s)+6Fe_2(SO_4)_3(aq) \rightarrow 5CuSO_4(aq)+13FeSO_4(aq)+4S(s)$ $CuFeS_2(s)+2Fe_2(SO_4)_3(aq) \rightarrow CuSO_4(aq)+5FeSO_4(aq)+2S(s)$ The rate and extent of copper leaching obtained in this series of reactions is directly linked to the availability of acid or acid and ferric ion.

Acid and ferric ion can also be consumed by "side" reactions with barren (of copper) minerals such as carbonates or other sulphides or sulphur. Ferric ion can also be consumed by hydrolysis to form precipitates such as ferric hydroxide, goethite, hematite and jarosite.

$CaCO_3(s)+H_2SO_4(aq)+H_2O \rightarrow CaSO_4 \cdot 2H_2O(s)+CO_2(g)$ $MgCO_3(s)+H_2SO_4(aq) \rightarrow MgSO_4(aq)+H_2O+CO_2(g)$ $S(s)+3Fe_2(SO_4)_3(aq)+4H_2O \rightarrow 4H_2SO_4(aq)+6FeSO_4(aq)$ $FeS_2(s)+Fe_2(SO_4)_3(aq) \rightarrow 3FeSO_4(aq)+2S(s)$ $Fe_2(SO_4)_3(aq)+6H_2O \rightarrow 2Fe(OH)_3(s)+3H_2SO_4(aq)$ $Fe_2(SO_4)_3(aq)+4H_2O \rightarrow 2FeO(OH)(s)+3H_2SO_4(aq)$ $Fe_2(SO_4)_3(aq)+3H_2O \rightarrow Fe_2O_3(s)+3H_2SO_4(aq)$ $3Fe_2(SO_4)_3(aq)+14H_2O \rightarrow 2H_3OFe_3(SO_4)_2(OH)_6(S)+5H_2SO_4(aq)$ Note that the interaction of these reactions can be complex with some reactions consuming acid and some producing acid.

In summary, in industrial leaching operations for copper, acid and ferric ion are required in sufficient amounts to complete the leaching reactions to maximize the extraction of copper.

In many leaching operations, acid is purchased and added as a reagent to the leach solution. Generally, ferric ion is produced in situ in leaching systems, for example, by oxidation of ferrous sulphate to ferric sulphate. In lower temperature systems, the oxidation of ferrous to ferric is catalyzed by natural bacterial action in the presence of oxygen from air. At higher temperature, superatmospheric-pressure oxygen is often supplied to accelerate the rate of oxidation in an autoclave.

$4FeSO_4+2H_2SO_4+O_2 \rightarrow 2Fe_2(SO_4)_3+2H_2O$

An example of such a process is described in International Patent Publication WO 00/06784. This document describes a process suitable for a high-pyrites content ore. High pyrites-content ores have sulphur content sufficient to regenerate acid in situ, making this process suitable for these types of ores. In many locations where copper is leached, the cost to purchase and transport acid for leaching of copper is prohibitively expensive, where the ore type and grade is insufficient for maintenance of sulphuric acid levels in situ, that is, without making up the acid levels with exogenous sulphuric acid.

A typical process utilizing an autoclave leach at elevated temperature with superatmospheric oxygen partial pressure is described in U.S. Pat. No. 5,698,170 (King, assigned to Placer Dome, Inc.). Again this process assumes that there is sufficient sulphur present to provide acid generation, and actually produces excess acid which ends up in the raffinate stream from solvent extraction. This raffinate must be neutralized, either by addition of base or by heap leach neutralization of basic rock or ore, with or without solvent extraction of neutralized raffinate to reduce the copper concentration. The neutralized raffinate then recycles to the process providing both temperature control and acid dilution of the acidic copper solution exiting the autoclave. Ferric oxidation is not a feature of this process in which the iron species are precipitated by chemistry typified by:

$4CuFeS_2+17O_2=4H_2O \rightarrow 4CuSO_4+4H_2SO_4+2Fe_2O_3 \downarrow$

Hitherto, it has not been possible to conveniently make rich ferric sulphate solutions for copper leaching at the same time as acid is formed in the autoclave, for low pyrites ores.

The reason for this is that the production of rich ferric sulphate and sulphuric acid is favored by higher autoclave temperatures and oxygen pressures. However, these same conditions favor side reactions that generate precipitated species in lieu of acid, or consume acid, resulting in the requirement for acid make-up. Also, in the case of high-pyrites containing ores, side reactions result in the precipitation of elemental sulphur, which creates processing difficulties at elevated temperatures at which viscous allotropes of sulphur form.

During autoclave pressure oxidation leaching of copper and iron sulphides and sulphur, a number of reactions will occur. These can be classified as oxidation reactions and precipitation reactions. For example, at high temperature (+150° C.):

Oxidation (all sulphide sulphur oxidizes to sulphate)

$CuFeS_2+4.25O_2+0.5H_2SO_4 \rightarrow CuSO_4+0.5Fe_2(SO_4)_3+0.5H_2O$ $CuS+2O_2 \rightarrow CuSO_4$ $FeS_2+3.75O_2+0.5H_2O \rightarrow 0.5Fe_2(SO_4)_3+0.5H_2SO_4$ $S+1.5O_2+H_2O \rightarrow H_2SO_4$ Iron Precipitation Reactions $Fe_2(SO_4)_3+3H_2O \rightarrow Fe_2O_3+3H_2SO_4$ $Fe_2(SO_4)_3+2H_2O \rightarrow 2Fe(OH)SO_4+H_2SO_4$ The oxidation reactions increase the solution content of dissolved copper, ferric ion and acid. The precipitation reactions precipitate iron as either hematite or basic ferric sulphate. In the first precipitation reaction, all sulphate stays in solution and acid is produced in significant amounts (three acid formed for each ferric sulphate). The second precipitation reaction forms basic ferric sulphate. In this reaction, the formation of acid is severely curtailed as the basic ferric sulphate contains two of the three available sulphates.

The formation of hematite as the iron precipitation product results in a high strength acid solution from the autoclave process. The formation of basic ferric sulphate has generally been viewed as undesirable as the basic ferric sulphate dramatically reduces the strength of acid and ferric sulphate in the autoclave discharge solution. From an environmental perspective, basic ferric sulphates are undesirable as basic ferric sulphates will gradually decompose in tailings impoundments, resulting in slow release of acid and ferric ion. This decomposition of basic ferric sulphate can acidify a tailing and result in acid mobilization of any contaminants in the tailings solids.

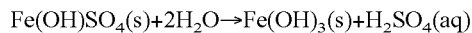
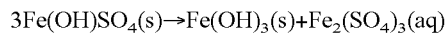

$Fe(OH)SO_4(s) + 2H_2O \rightarrow Fe(OH)_3(s) + H_2SO_4(aq)$ $3Fe(OH)SO_4(s) \rightarrow Fe(OH)_3(s) + Fe_2(SO_4)_3(aq)$ Unfortunately, the formation of basic ferric sulphates is favoured by (1) higher temperature and (2) increasing concentration of dissolved salts. For example, as the magnesium sulphate level is increased in solution, the "break" point indicating the onset of basic ferric sulphate precipitation advances to lower free acid concentrations.

To summarize, under certain operating conditions for pressure oxidation of copper/iron/sulphur containing ores, concentrates or residues, the autoclave leach solution will contain dissolved copper and ferric sulphate salts and sulphuric acid while the residues will contain hematite and basic ferric sulphate. The presence of basic ferric sulphate reduces (1) the available acid in the autoclave solution (acid formation by iron precipitation is attenuated) and (2) the available ferric sulphate in the autoclave solution. In addition, the presence of basic ferric sulphate will render the autoclave residue environmentally unstable. For these reasons, to avoid basic ferric sulphate formation, autoclave conditions are controlled by (1) lowering the operating temperature, (2) reducing the pulp density (solid to liquid ratio) within the limits of an overall heat balance and (3) leaching in water rather than leaching in available sulphate containing solutions. All of these control strategies are undesirable as they result in increased costs or processing complexity. For example, at lower temperature, all oxidation reactions are slower and therefore a longer autoclave oxidation time is required. This would necessarily require a larger autoclave for treatment at the lower temperature. Similarly the reduction of pulp density results in movement of more water and less solid through the autoclave, again increasing the size of the autoclave. Finally, leaching in water rather than leaching in available sulphate containing solutions may unreasonably constrain the operation of a commercial autoclave facility by disrupting the overall site "water balance".

It is one purpose of embodiments of the present invention to provide a ready source of both sulphuric acid and ferric ion from the autoclave oxidation of copper/iron/sulphur containing feed material. It is a purpose of certain embodiments of the present invention to provide a source of ferric ion for the production of a strong oxidizing solution suitable for oxidizing other minerals such as zinc sulphides, uranium oxides, nickel and cobalt sulphides, and many others.

DETAILED DESCRIPTION OF THE INVENTION

In one aspect the present invention resides broadly in a method for leach extraction of mineral bearing ores and concentrates including the step of leaching said mineral with an aqueous stream containing ferric ions and sulphuric acid in the presence of oxygen, at least part of said aqueous stream comprising a solution formed by reaction of basic ferric sulphate with excess sulphuric acid.

The basic ferric sulphate may be produced by any suitable means. For example, the basic ferric sulphate may be produced as a by-product of minerals processing. Alternatively the basic ferric sulphate may be produced de novo in a process such as the autoclave oxidation of iron-bearing pyrite mineral slurry at elevated temperatures and under superatmospheric-pressure oxygen. Typically production of basic ferric sulphate precipitate is favored by temperatures above 150° C., preferably above 200° C., and oxygen overpressures in excess of 4 bar, typically about 6 bar.

The iron-bearing pyrite mineral may be native pyrite ore or may be produced as a by-product of mixed-ore processing. For example, the iron-bearing pyrite mineral may be obtained from the solids residue of processing copper/iron/sulphur bearing ores such as chalcocites. In particular embodiments of the present invention the iron-bearing pyrites mineral forms a part of the solids separated from an atmospheric ferric/acid leach of aqueous slurries of chalcocite ores. The separated solids may be concentrated by flotation to produce a pyrites concentrate and tailings stream, and this is particularly preferred in the case of ores having relatively low pyrite content.

The basic ferric sulphate leaching step may comprise the addition of acidified water to the solid basic ferric sulphate and aging the slurry for a time and at a temperature sufficient for the supernatant to charge with ferric ions. Alternatively, the basic ferric sulphate leaching step may simply comprise the releaching of the basic ferric sulphate slurry from the autoclave of its production, wherein the temperature of the slurry is reduced to a temperature that favors the releaching of the basic ferric sulphate to form a supernatant of strong ferric and acid content. The temperature and time of residence must be determined empirically since it will depend on the source of the basic ferric sulphate and the releaching solution. However, as a guide it has been determined that autoclave-formed precipitate containing basic ferric sulphate may be leached by acidified solution or fresh water at temperatures below about 100° C., and typically about 95° C., and autoclave slurries may be cooled to at least below 100° C. to 120° C. depending on chemical environment and preferably to about 85° C. for releaching.

In particular embodiments of the present invention, a primary ore stream may be directly autoclaved to produce a first winnable raffinate which may be processed to strip acid, and a solids slurry containing basic ferric sulphate that may be admitted, either directly or after separate releaching, to an atmospheric leach (with concurrent releaching of basic ferric sulphate) of a second ore slurry stream, with or without the stripped acid as necessary. This achieves the primary object of producing basic ferric sulphate in the autoclave followed by an atmospheric redissolution of basic ferric sulphate in an acidic solution to produce an acidic ferric sulphate solution for use in leaching of copper minerals.

In another aspect this invention resides broadly in a method for leach extraction of relatively low pyrites-containing chalcocite ores including the steps of:

(a) atmospheric leaching of said ore with a contactor solution including ferric ion and sulphuric acid;

(b) passing the pregnant leach solution of step (a) to copper winning;

(c) autoclaving an aqueous slurry of the pyrites-containing solids from step (a) in the presence of oxygen at a temperature and a time to produce basic ferric sulphate precipitate as a component of the autoclave discharge solids;

(d) reacting said basic ferric sulphate within the autoclave discharge solids with aqueous sulphuric acid to form a solution containing ferric ion and sulphuric acid; and (e) recycling said solution to step (a).

In preferred embodiments, the invention involves the precipitation of basic ferric sulphate at high temperature which may be conveniently redissolved by lowering the temperature of the autoclave discharge slurry, resulting in production of a rich ferric sulphate solution for leaching reduced copper minerals. In this case the aqueous acid required for redissolution is formed as a consequence of the autoclaving process. The lowering of the temperature may be a consequence of pumping the acidified basic ferric sulphate slurry directly to the atmospheric leach step, where mixing with the incoming ore slurry reduces the temperature to permit redissolution. Alternatively the basic ferric sulphate precipitate may be filtered off ahead of redissolution with aqueous acid to form an acid ferric sulphate solution for leaching in step (a).

The aqueous slurry from step (a) may be passed directly to autoclaving if the pyrite content is sufficiently high. In other cases the pyrite content may be enhanced by producing a concentrate by any known means such as flotation or the like.

In this work a method was developed to overcome the problems associated with basic ferric sulphate formation. First, conditions were set for pressure oxidation where formation of basic ferric sulphate occurred. The basic ferric sulphate in the autoclave discharge solids was then selectively re-dissolved at temperatures up to the boiling point by allowing acid produced in the autoclave to attack the basic ferric sulphate formed at elevated temperature. The chemistry of re-dissolution is shown below:

$$2Fe(OH)SO_4 + H_2SO_4 \rightarrow Fe_2(SO_4)_3 + 2H_2O$$

The re-dissolution of basic ferric sulphate allows the autoclave design engineer or operator the freedom to purposely form basic ferric sulphate in the pressure oxidation of copper—iron—sulphur feed materials. By extension, this also allows the designer/operator the ability to increase temperature to accelerate the rate of oxidation, to increase pulp density within the limits of the overall heat balance so as to minimize autoclave size and finally to perform the pressure oxidation in whatever solution is most appropriate in view of the overall site water balance.

A further benefit of this re-dissolution of basic ferric sulphate dramatically reduces the environmental issues associated with basic ferric sulphate decomposition in tailings disposal of autoclave discharge solids.

Finally, the "re-dissolution" solution from acid attack of the basic ferric sulphate is now rich in both acid and ferric sulphate content and is an ideal leach solution for further leaching of copper (or other metals in other applications).

Further, the re-dissolution reaction can be affected by for example, holding the autoclave discharge slurry at temperatures of up to the boiling point under atmospheric pressure, or at higher temperatures with overpressure. Once the basic ferric sulphate has been largely converted to soluble ferric sulphate, the slurry can be directed toward a leaching process for copper in which acid and ferric sulphate are required. Alternately, the slurry can be treated to separate a solid residue (barren of basic ferric sulphate) and an acidic ferric sulphate solution that can then be directed to a leaching process (without forwarding the solid residue at the same time).

In an alternate embodiment, the autoclave discharge slurry can be mixed with, for example, a copper—iron—sulphide raw material. The advantage of this embodiment is that the re-dissolution of basic ferric sulphate and the leaching of the copper—iron—sulphide raw material with the acidic ferric sulphate solution can proceed simultaneously.

The invention will be further described with reference to the following examples and the Figures, wherein FIG. 1 is a flowsheet of a process in accordance with the present invention;

Figure 1:
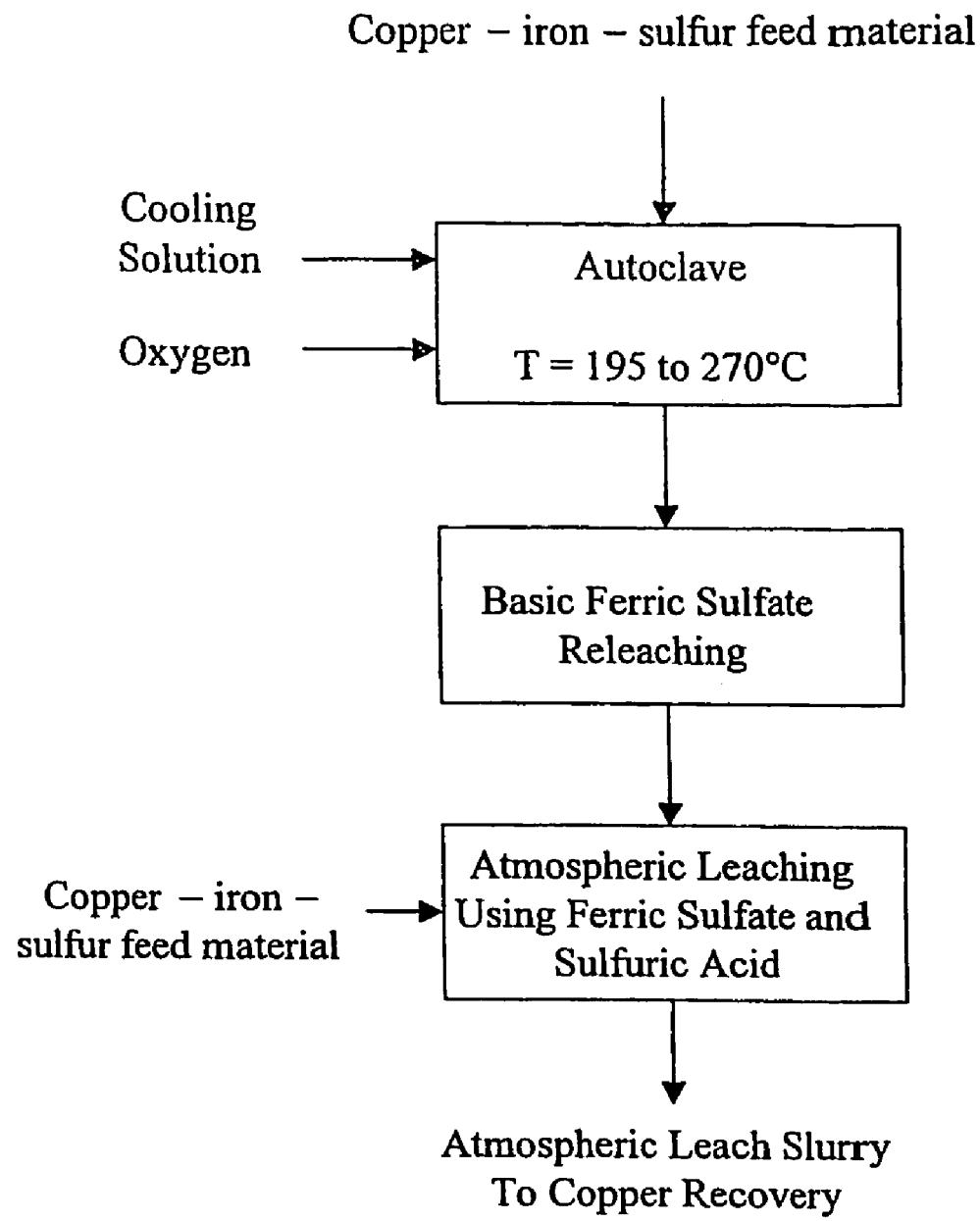
Figure 2:
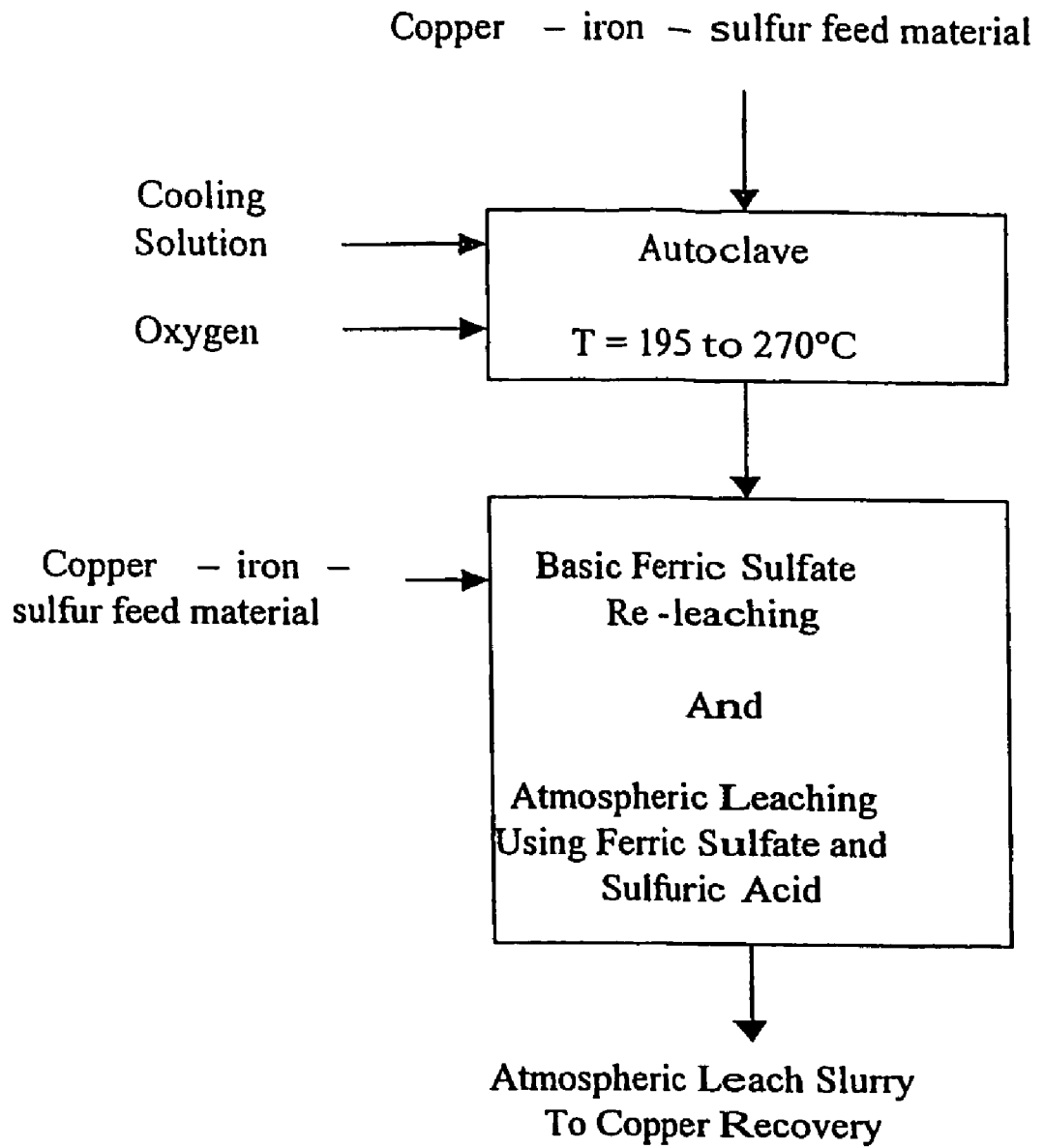
FIG. 2 is a flowsheet of an alternative process in accordance with the present invention.
Figure 3:
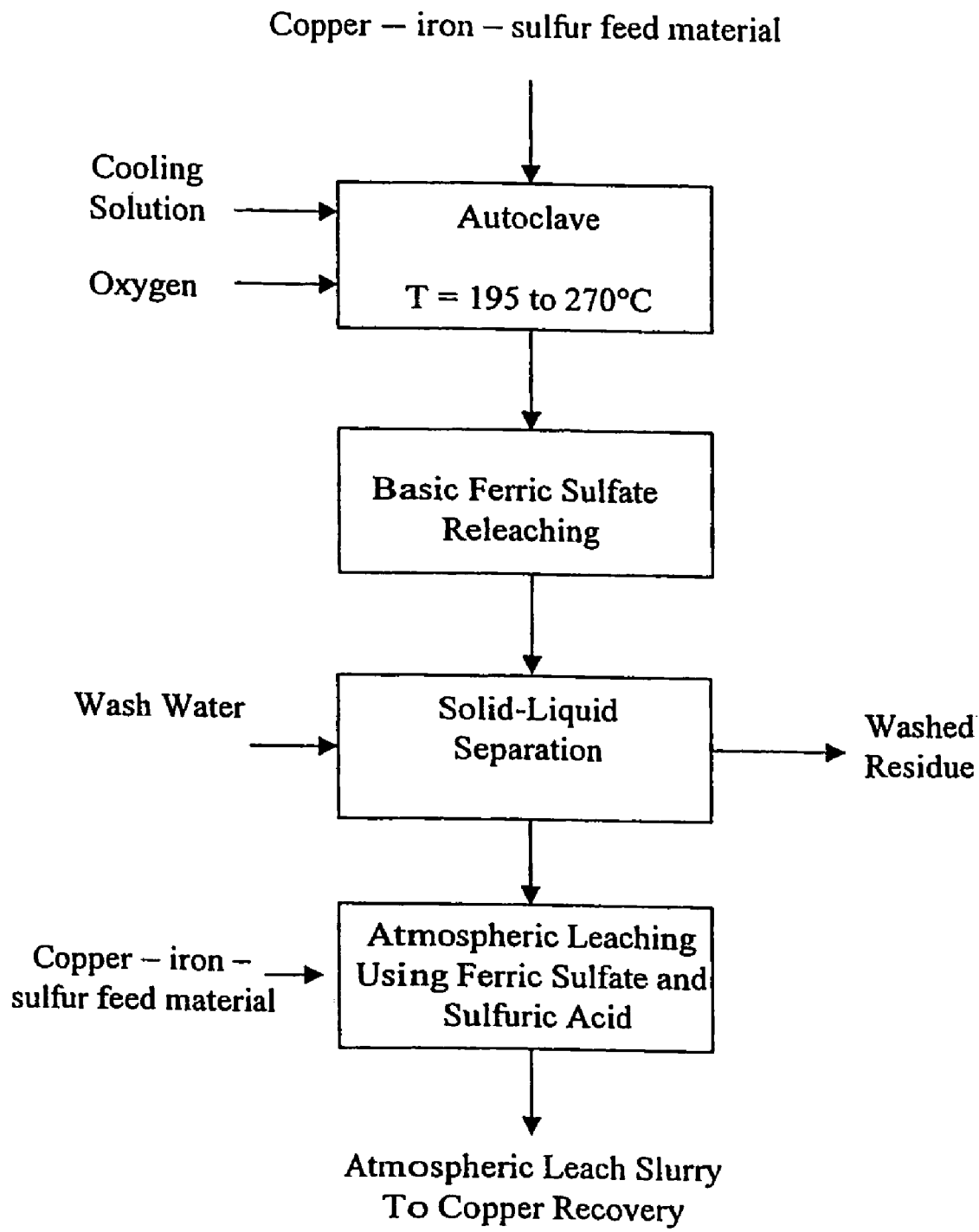
FIG. 3 is a flowsheet of a yet further alternative process in accordance with the present invention.

These three processes are shown schematically below in a series of flowsheets.

The following examples illustrate the method of the invention.

EXAMPLE 1

A 200 gm sample of solid containing 6.91% Cu. 29.1% Fe, 43.2% S(total), 33.2% S(sulphide), 9.03% S(elemental) and 0.95% S(sulphate) at P80 of 108 um particle size was mixed with 2 L of solution containing 4 g/L Cu, 12.98 g/L Fe (total), 12.0 g/L Fe(+3), 0.98 g/L Fe(+2) and 23.39 g/L $H_2SO_4$, was oxidized at 220° C. for 25 minutes with 6 bar oxygen overpressure.

At the end of the test, the autoclave was quickly cooled, emptied and subjected to filtration and washing to separate solids and liquids. The leach solution and leach solid were collected, measured and analyzed.

The leach solution recovered from this test was 1990 mL with 8.6 g/L Cu, 13.8 g/L Fe(total), 1.1 g/L Fe(+2), 12.7 g/L Fe(+3) and 73.3 g/L $H_2SO_4$.

The leach solid residue weighed 197.7 gm and analyzed 0.16% Cu, 27.7% Fe, 17.8% S(total), 2.7 S(sulphide), 1.1% S(elemental) and 14.0% S(sulphate).

Inspection of these results shows that copper extraction was~96.7% and that most of the sulphur was oxidized to sulphate. The iron content of the leach solution was largely unchanged (13.8 g/L total versus an initial 12.98 g/L) while the acid level increased significantly. Much of the sulphate formed by oxidation coprecipitated with the iron in the autoclave residue as basic ferric sulphate. This is the reason for 14.0% S(Sulphate) in the autoclave discharge residue.

This example illustrates the ready formation of basic ferric sulphate in the autoclave 220° C.

EXAMPLE 2

| Test No | AC409 |
|---|---|
| Description 3 | 220° C. leach with atmospheric post leach to releach 'basic iron sulphate' |
| Surfactant kg/t | 0.0 |
| Leach Temp ° C. | 220 |
| Sample | Blend ESPAN 3/CMT/S0 |
| Heat up phase mins | 49 |
| Oxygen pressure Bar | 6 |
| Autoclave leach mins | 60 |
| Grind Size microns | 108 |
| Start Solution | |
| Volume ml | 2000 |
| Solution sg | 1.06 |
| Cu g/l | 4 |
| Fe (tot) g/l | 12.98 |

-continued

| Test No | AC409 |
|---|---|
| Fe2+ g/l | 12 |
| Fe3+ g/l | 0.98 |
| As g/l | 0.0068 |
| Co ppm | 3 |
| H2SO4 g/l | 23.39 |
| Ferric/Ferrous ratio | 0.08 |
| Total $SO_4^{2-}$ g/l (calc) | 52.20 |
| End Solution | |
| Volume ml | — |
| Solution sg | — |
| Cu g/l | 10.9 |
| Fe (tot) g/l | 36.1 |
| Fe2+ g/l | — |
| Fe3+ g/l | 36.1 |
| As g/l | 0.222 |
| Co ppm | 49 |
| H2SO4 g/l | 47.0 |
| Total $SO_4^{2-}$ g/l (calc) | 155.40 |
| Metal Recovery % (based on solids) | |
| Weight loss % | |
| Cu | |
| Fe | |
| As | |
| Co | |
| Oxygen consumption g | 163.0 |
| Oxygen consumption kg/t | 815.0 |
| g Oxygen per g Cu leached | |
| Leach feed solids assay | |
| Weight gm | 200 |
| % Cu | 6.91 |
| % Fe | 29.1 |
| % As | 0.24 |
| Co ppm | 640 |
| S(sulphide) % | 33.2 |
| S(total) % | 43.2 |
| S(elem) % | 9.03 |
| S(sulphate) % | 0.95 |
| Leach residue solids assay | |
| Weight gm | na |
| % Cu | 0.09 |
| % Fe | 29.6 |
| % As | 0.01 |
| Co ppm | 16 |

Figure 4:
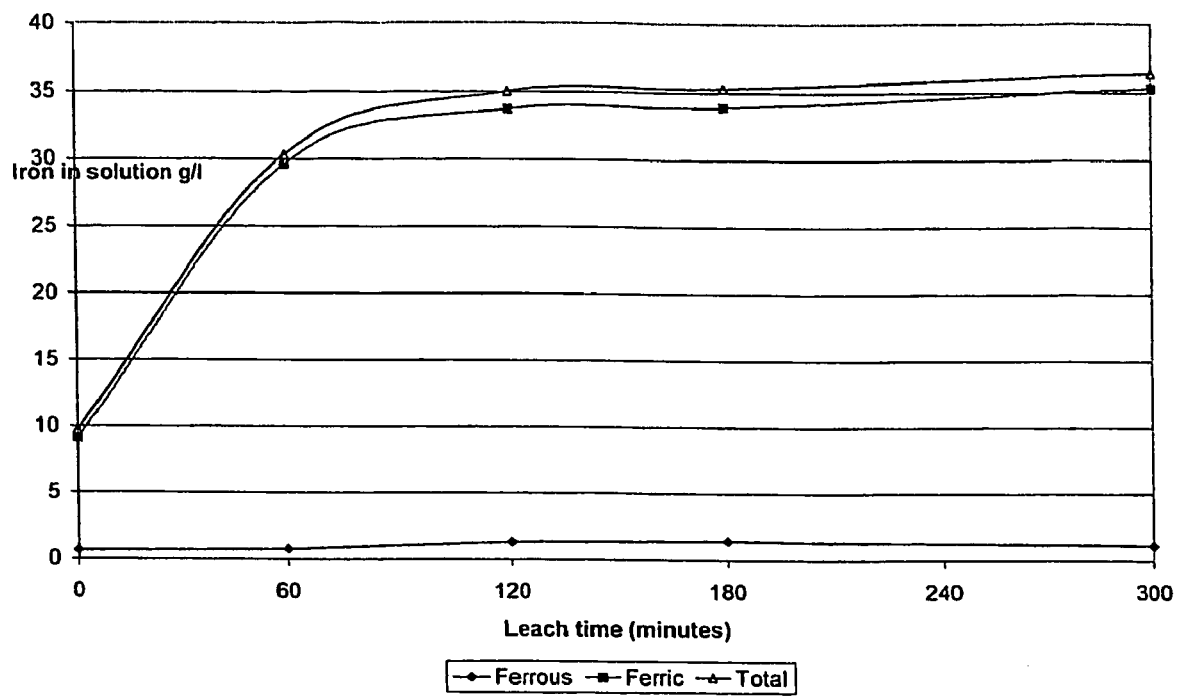
FIG. 4 is a graphic representation of results of an atmospheric leach of residue suitable for use in processes in accordance with the present invention.

Table 7 and FIG. 4 show results for an atmospheric leach of residue produced from a 220° C., 60 minute, autoclave test, designated AC409. Atmospheric leach conditions were: AC409 residue+175 ml of 12 g/l $H_2SO_4$, 5 g/l Fe2+, 0.4 g/l Cu, 95° C., leach time 300 minutes. Under these conditions ferric iron is readily dissolved from basic iron sulphate produced in the autoclave. The increase of the ferric content from 9.1 g/L to 35.3 g/L validates the controlled redissolution of basic ferric sulphate and the production of a rich ferric sulphate solution.

TABLE 7

Atmospheric re-leach of basic iron sulphate
AC409 residue + 175 ml of 12 g/l H2SO4, 5 g/l Fe2+ , 0.4 g/l Cu, 95° C.

| Time (minutes) | $Fe^{2+}$ g/l | $Fe^{3+}$ g/l | $Fe_{total}$ g/l |
|---|---|---|---|
| 0 | 0.6 | 9.1 | 9.7 |
| 60 | 0.7 | 29.6 | 30.3 |
| 120 | 1.3 | 33.7 | 35.0 |
| 180 | 1.4 | 33.9 | 35.3 |
| 300 | 1.1 | 35.3 | 36.4 |
| end liquor SG: | | 1.17 | |

EXAMPLE 3

TABLE 18

Summary of leach results-220° C. Tests with atmospheric post leach

| Test No | AC410 | AC410 + atm |
|---|---|---|
| Description 3 | 220° C. leach with atmospheric post leach with fresh feed to atm leach | treated as 1 test |
| Surfactant kg/t | 0.0 | 0.0 |
| Leach Temp ° C. | 220 | 220 |
| Sample | Sepon | Sepon |
| Heat up phase mins | 52 | 52 |
| Oxygen pressure Bar | 6 | 6 |
| Autoclave leach mins | 30 | 30 |
| Grind Size microns | 57 | 57 |
| Start Solution | | |
| Volume ml | 2134 | 2134 |
| Solution sg | 1.08 | 1.08 |
| Cu g/l | 4 | 4 |
| Fe (tot) g/l | 12.98 | 12.98 |
| Fe2+ g/l | 12 | 12 |
| Fe3+ g/l | 0.98 | 0.98 |
| As g/l | 0.0068 | 0.0068 |
| Co ppm | 3 | 3 |
| H2SO4 g/l | 23.39 | 23.39 |
| Ferric/Ferrous ratio | 0.08 | 0.08 |
| Total $SO_4^{2-}$ g/l (calc) | 52.20 | 52.20 |
| End Solution | | |
| Volume ml | — | |
| Solution sg | — | |
| Cu g/l | 9.5 | |
| Fe (tot) g/l | 25.7 | |
| Fe2+ g/l | — | |
| Fe3+ g/l | 25.7 | |
| As g/l | 0.222 | |
| Co ppm | 49 | |
| H2SO4 g/l | 46.9 | |
| Total $SO_4^{2-}$ g/l (calc) | 126.61 | |
| Weight loss % | | 35.4 |
| Cu | | 87.9 |
| Fe | | 46.6 |
| As | | 57.9 |
| Co | | 82.4 |
| Oxygen consumption g | 122.0 | 122.0 |
| Oxygen consumption kg/t | 610.0 | 366.4 |
| g Oxygen per g Cu leached | | 8.45 |
| Leach feed solids assay | | |
| Weight gm | 200 | 333 |
| % Cu | 4.93 | 4.93 |
| % Fe | 24.34 | 24.34 |
| % As | 0.46 | 0.46 |
| Co ppm | 55 | 55 |
| S(sulphide) % | 25.5 | 25.5 |
| S(total) % | 31.6 | 31.6 |
| S(elem) % | 6.05 | 6.05 |
| S(sulphate) % | 0.02 | 0.02 |
| Leach residue solids assay | | |
| Weight gm | | 215.21 |
| % Cu | | 0.92 |
| % Fe | | 20.1 |
| % As | | 0.30 |
| Co ppm | | 15 |

TABLE 8

220° C. autoclave leach with partial bypass
and atmospheric leach of A/C residue

| Test No | AC410 + Atmospheric post leach |
|---|---|
| A/C Leach Temp ° C. | 220 |
| Sample | Sepon |
| Autoclave leach mins | 30 |
| Atmospheric Leach Temp° C. | 95 |
| Atmospheric leach mins | 360 |
| Grind Size microns | 57 |
| Overall Metal Recovery % (based on solids) | |
| Weight loss % | 35.4 |
| Cu | 87.9 |
| Fe | 46.6 |
| Oxygen consumption kg/t | 366.4 |
| g Oxygen per g Cu leached | 8.45 |

TABLE 9

Atmospheric re-leach of AC410 residue + fresh feed
AC410 residue + 133 g Sepon A/C feed + 200 ml of
12 g/l $H_2SO_4$, 5 g/l $Fe^{2+}$, 0.4 g/l Cu, 95° C.

| Time | Fe2+ | Fe3+ | Fe total |
|---|---|---|---|
| 0 | 0.3 | 10.1 | 10.4 |
| 60 | 8.9 | 18.2 | 27.1 |
| 120 | 8.8 | 18.8 | 27.6 |
| 180 | 10.1 | 17.9 | 28.0 |
| 240 | 10.4 | 17.6 | 28.0 |
| 360 | 11.8 | — | — |
| residue wt | | 215.21 | |
| End liquor SG | | 1.156 | |

The results for this test show (1) high degree of iron dissolution in the atmospheric releach and (2) excellent overall copper extraction.

It will of course be realised that while the above has been given by way of illustrative example of this invention, all such and other modifications and variations thereto as would be apparent to persons skilled in the art are deemed to fall within the broad scope and ambit of this invention as defined in the claims appended hereto.

The invention claimed is:

1. A method for leach extraction of copper-iron-sulfur feed material including the step of leaching said material with an aqueous stream containing ferric ions and sulphuric acid in the presence of oxygen at a temperature of 195 to 270° C, in an autoclave, at least part of said aqueous stream comprising a solution formed by reaction of basic ferric sulphate with excess sulphuric acid.

2. A method according to claim 1, wherein said basic ferric sulphate is produced as a by-product of minerals processing.

3. A method according to claim 1, wherein said basic ferric sulphate is produced by autoclave oxidation of iron-bearing pyrite mineral slurry under superatmospheric-pressure oxygen.

4. A method according to claim 3, wherein said superatmospheric-pressure oxygen is provided by an atmosphere having oxygen overpressure in excess of 4 bar.

5. A method according to claim 3, wherein said iron-bearing pyrite mineral is selected from the group consisting of native pyrite ore and a by-product of mixed-ore processing.

6. A method according to claim 5, wherein said by-product of mixed-ore processing is obtained from the solids residue of processing ores bearing at least one of copper, iron, and sulphur.

7. A method according to claim 6, wherein said iron-bearing pyrites mineral forms a part of the solids separated from an atmospheric ferric and acid leach of aqueous slurries of chalcocite ores.

8. A method according to claim 7, wherein said separated solids are concentrated by flotation to produce a pyrites concentrate and tailings stream.

9. A method according to claim 1, wherein said reaction of basic ferric sulphate with excess sulphuric acid includes the addition of acidified water to solid basic ferric sulphate to produce a slurry, and aging the slurry for a time and at a temperature sufficient for the supernatant to charge with ferric ions.

10. A method according to claim 3, wherein said reaction of basic ferric sulphate with excess sulphuric acid includes the releaching of a basic ferric sulphate slurry obtained from the autoclave of its production, wherein the temperature of the slurry is reduced to a temperature that favors the releaching of the basic ferric sulphate to form a supernatant of strong ferric and acid content.

11. A method according to claim 10, wherein said basic ferric sulphate slurry is cooled to at least below 100° C. to 120° C. depending on chemical environment for releaching.

12. A method according to claim 1, wherein a primary ore stream is subjected to pressure oxidative autoclaving to produce a first winnable raffinate and a solids slurry containing said basic ferric sulphate that is admitted to said aqueous stream.

13. A method for leach extraction of relatively low pyrites-containing chalcocite ores including the steps of: (a) atmospheric leaching of said ore with a contactor leach solution including ferric ion and sulphuric acid to form an aqueous slurry of pyrites-containing solids; (b) passing a pregnant leach solution obtained from step (a) to copper winning; (c) autoclaving said aqueous slurry of pyrites-containing solids from step (a) in the presence of oxygen at 195 to 270° C. and a time to produce basic ferric sulphate precipitate as a component of the autoclave discharge solids; (d) reacting said basic ferric sulphate within the autoclave discharge solids with aqueous sulphuric acid to form a solution containing ferric ion and sulphuric acid; and (e) recycling said solution from step (d) to step (a).

14. A method according to claim 13, wherein the precipitation of basic ferric sulphate in step (c) is redissolved in step (d) by lowering the temperature of the autoclave discharge slurry.

15. A method according to claim 14, wherein the lowering of the temperature is by means selected from (1) pumping the acidified basic ferric sulphate slurry directly to the atmospheric leach step, where mixing with the incoming ore slurry reduces the temperature to permit redissolution by the acid produced by autoclaving, and (2) filtering the basic ferric sulphate precipitate ahead of redissolution with aqueous acid to form an acid ferric sulphate solution for leaching in step (a).

16. A method according claim 13, wherein said aqueous slurry of pyrites-containing solids from step (a) is passed directly to autoclaving.

17. A method according claim 13, wherein said aqueous slurry of pyrites-containing solids from step (a) has its pyrite content enhanced by concentration before passing to autoclaving step (c).

18. A method according to claim 5, wherein said iron-bearing pyrite mineral is selected from the group consisting of native pyrite ore and a by-product of mixed-ore processing.

19. A method according to claim 14, wherein said aqueous slurry of pyrites-containing solids from step (a) is passed directly to autoclaving.

20. A method according claim 15, wherein said aqueous slurry of pyrites-containing solids from step (a) is passed directly to autoclaving.

21. A method according to claim 14, wherein said aqueous slurry of pyrites-containing solids from step (a) has its pyrite content enhanced by concentration before passing to autoclaving step (c).

22. A method according to claim 15, wherein said aqueous slurry of pyrites-containing solids from step (a) has its pyrite content enhanced by concentration before passing to autoclaving step (c).

* * * * *

UNITED STATES PATENT AND TRADEMARK OFFICE
CERTIFICATE OF CORRECTION

| | | |
|---|---|---|
| PATENT NO. | : 7,799,295 B2 | Page 1 of 1 |
| APPLICATION NO. | : 10/578533 | |
| DATED | : September 21, 2010 | |
| INVENTOR(S) | : Dreisinger et al. | |

It is certified that error appears in the above-identified patent and that said Letters Patent is hereby corrected as shown below:

Column 1 line 56, please delete "$Fe_2(sO_4)_3$" and change to --$Fe_2(SO_4)_3$--

Column 1 line 58, please delete "$Fe_2(sO_4)_3$" and change to --$Fe_2(SO_4)_3$--

Column 5 line 36, please delete "$Fe_2(sO_4)_3$" and change to --$Fe_2(SO_4)_3$--

Column 1 line 59, please delete "$(OH)_6(S)+$" and change to --$(OH)_6(s)+$--

Claim 18, at Column 11, line 1, delete "claim 5" and insert --claim 4--

Signed and Sealed this
First Day of February, 2011

David J. Kappos
*Director of the United States Patent and Trademark Office*